Dec. 28, 1926.

H. G. STRAIN

TONGS

Filed June 5, 1923

1,612,474

Witness:
Geo. E. Porter.

Inventor

Patented Dec. 28, 1926.

1,612,474

UNITED STATES PATENT OFFICE.

HERBERT G. STRAIN, OF SAN FRANCISCO, CALIFORNIA.

TONGS.

Application filed June 5, 1923. Serial No. 643,567.

The object of my invention is to provide a simple, positive means of securing and holding the free end of the universal-joint of a motor vehicle in the proper position and alignment to allow it to enter the corresponding recess in the drive shaft when assembling.

Figure 1:
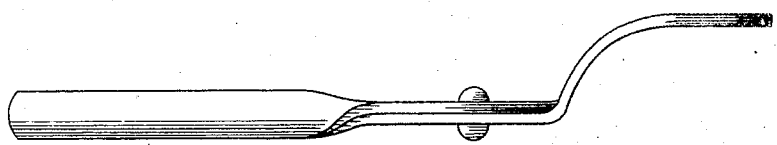
Figure 2:
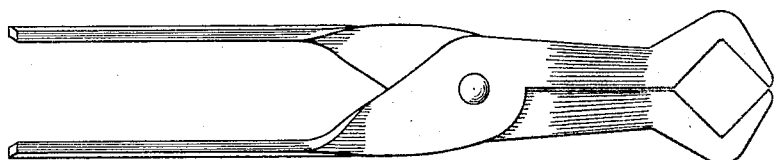
Figure 3:
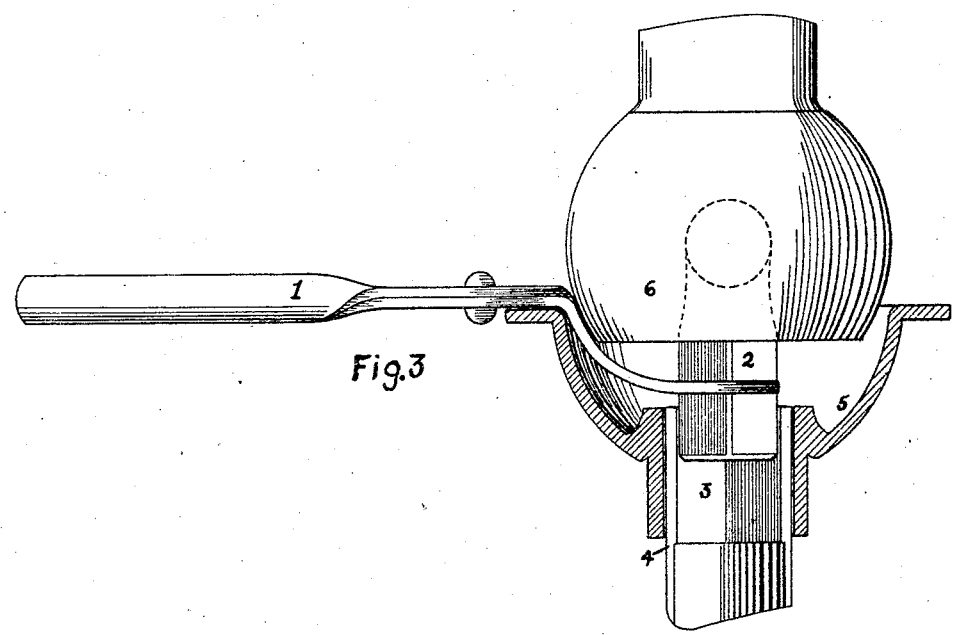

One form of the invention is illustrated in the accompanying drawing, in which Fig. 1 is an edgewise view of the tongs; Fig. 2 is a flatwise view of the same; and Fig. 3 is an edgewise view of the tongs showing the relative position of same with reference to the proximate parts of the machine (Ford automobile) on which the tongs are applied. Referring more particularly to Fig. 3 of the drawing, the numeral 1 indicates the tongs; 2 indicates the square (male) end of the universal-joint; 3 indicates the square recess in the drive shaft; 4 indicates the drive shaft; 5 indicates the forward ball cap; and 6 indicates the universal ball.

The tongs are made with thin jaw blades, offset and bent to such a shape as to allow the universal ball to enter the ball cap a considerable distance with the tongs in place (Fig. 3), and having the ends (bight) of the jaw blades of such shape (Fig. 2) as to positively and firmly grasp the free end of the universal-joint, thereby affording complete control of the position and motion of the said free end of the universal-joint until it enters the recess in the drive shaft.

By bending and offsetting the jaw blades of the tongs to approximately the contour of the universal ball the said ball may enter the ball cap a considerable distance before it is necessary to withdraw the tongs to enter ball completely, and by which time the free end of the universal-joint has entered the recess in the drive shaft a sufficient distance to insure that it is in the proper position and alignment to completely enter recess, and that there is no possibility of it becoming otherwise, after the tongs are withdrawn, while the universal ball is being entered into place.

I am not aware of there ever having been any device or tongs made or used for the purpose of holding and securing in proper position and alignment the square (male) end of the Ford universal-joint, or the universal-joint on any other make of automobile or other machines, while assembling and, therefore

I claim:

Means for alining the squared stub shaft of a universal joint enclosed by a ball with a registering recess in a second shaft having a socket for the ball projecting therefrom, the said means comprising a pair of tongs pivotally connected to one another substantially at their center and formed with registering V-shaped recesses in the extremities thereof allowing a cornerwise grip to be secured on the stub shaft, and forming a substantially square aperture when the jaws are brought together, the extremities being offset from the remainder of the tongs in a curvature substantially corresponding to the curvature of the ball and being comparatively thin, whereby the jaws may be inserted between the ball of the universal joint and the socket thereof.

HERBERT G. STRAIN.